L. R. DONOVAN.
STORM WINDOW ATTACHMENT FOR LOCOMOTIVE CABS.
APPLICATION FILED MAY 2, 1919.
1,345,147. Patented June 29, 1920.
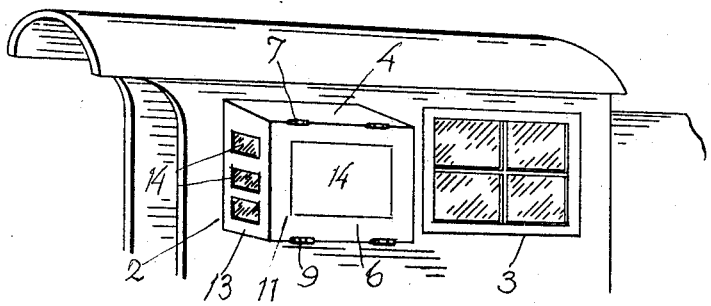
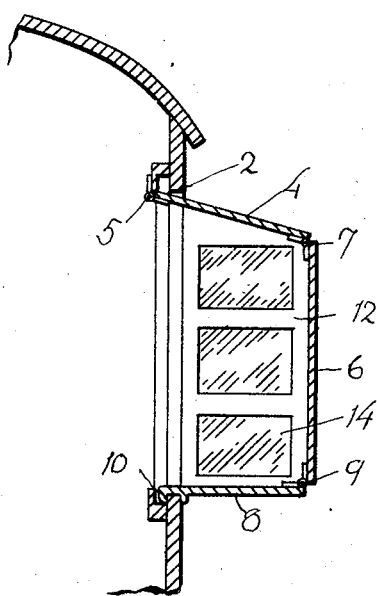
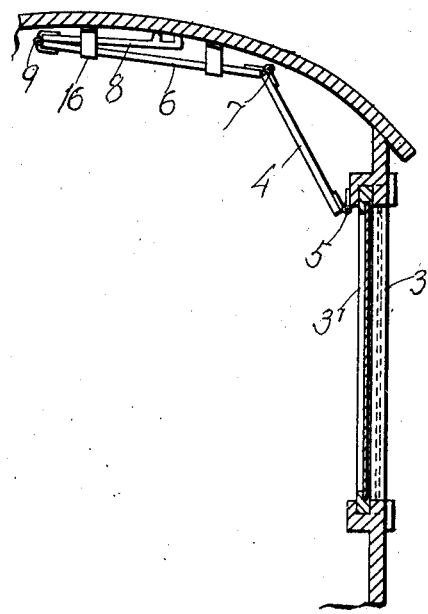
Inventor:
Leo R Donovan
E. W. Anderson for
Attorneys

UNITED STATES PATENT OFFICE.

LEO R. DONOVAN, OF NORWOOD, NEW YORK.

STORM-WINDOW ATTACHMENT FOR LOCOMOTIVE-CABS.

1,345,147.

Specification of Letters Patent. Patented June 29, 1920.

Application filed May 2, 1919. Serial No. 294,351.

*To all whom it may concern:*

Be it known that I, LEO R. DONOVAN, a citizen of the United States, resident of Norwood, in the county of St. Lawrence and State of New York, have made certain new and useful Improvements in Storm-Window Attachments for Locomotive-Cabs; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied.

Fig. 2 is a transverse section of the same.

Fig. 3 is a similar view with the window folded up out of the way.

The invention has relation to storm windows, having for its object to provide an attachment for locomotive cab windows that will protect the engineer or one of the train crew while looking forwardly or backwardly with the head located outside the cab window, the latter of course being open. Inasmuch as the cab window must be open to enable the engineer to look ahead or back, he is exposed to all kinds of bad weather which it is desired to protect him from, at the same time interfering in no way, but rather facilitating proper inspection of the track in both directions.

The invention consists in the novel construction and combinations of parts, as hereinafter set forth.

In the accompanying drawings illustrating the invention, the numeral 2 designates a locomotive cab window frame, to which the invention is shown as applied, front and rear sliding windows being shown at 3, 3', and the rear sliding window being slid forwardly.

The preferred embodiment of the invention is shown in Figs. 1, 2, and 3 of the drawings, and consists of an outwardly and laterally projecting top-section 4, hinged at its inner edge to the window frame at 5; a downwardly projecting vertical side-section 6, hinged at its upper edge to the top-section at 7; an inwardly and laterally projecting bottom-section 8, hinged at its outer edge to the side-section at 9 and having a detachable but strong and well braced connection at its inner edge at 10 with the lower edge or sill of the window frame. The side, front and back of the attachment frame are filled in or covered as at 11, 12, and 13, in suitable manner, as with flexible waterproof material similar to automobile curtains and having transparent insertions 14, where needed, this curtain or curtains to be attachable and detachable in any suitable manner, and adapted to be folded when not in use.

When the window attachment is not needed, it is folded inwardy and upwardly as shown in Fig. 3 of the drawings, where it is held by straps or clasps 16, the top-section folding upwardly and inwardly at an angle approximately that of the cab roof at the side, the side-section extending almost horizontally close to the cab roof, and the bottom-section being folded reversely upon the side-section also horizontally and close to the cab roof, so that the folded device is out of the way.

The rectangular frames composing the top, side and bottom sections may be skeleton-form or solid, and filled in any suitable way.

The connection at 10 with the window sill is sufficient to hold the attachment frame set and braced for use, but other bracing means may be used instead or to supplement this connection to hold the entire frame rigid and set for use.

I claim :—

A storm window attachment for locomotive cabs having a window frame, including an outwardly projecting top section hinged to the upper edge of the inside of the window frame and foldable inwardly and upwardly toward the top of the cab, a downwardly extending vertical side section hinged to said top section and angularly related thereto and foldable to assume an opposite angular relation thereto close to the top of the cab, and a bottom section hinged to the lower edge of said side section and foldable against the inner side of the same close to the top of the cab, said bottom section having at its inner marginal portion detachable supporting connection with the window sill.

In testimony whereof I affix my signature in presence of two witnesses.

LEO R. DONOVAN.

Witnesses:
WILLIS J. FLETCHER,
J. B. PRINGLE.